United States Patent [19]

Nelle

[11] 4,297,033

[45] Oct. 27, 1981

[54] INCREMENTAL PHOTOELECTRIC MEASURING DEVICE

[75] Inventor: Günther Nelle, Bergen, Fed. Rep. of Germany

[73] Assignee: Dr. Johannes Heidenhain GmbH, Traunreut, Fed. Rep. of Germany

[21] Appl. No.: 45,295

[22] Filed: Jun. 4, 1979

[30] Foreign Application Priority Data

Jun. 15, 1978 [DE] Fed. Rep. of Germany ....... 2826213

[51] Int. Cl.³ .................... G01B 11/14; G01B 11/04
[52] U.S. Cl. .................... 356/374; 250/237 G
[58] Field of Search .............. 356/374, 395; 250/237 G, 231 SE, 237 R; 350/162 R

[56] References Cited

U.S. PATENT DOCUMENTS

| | | | |
|---|---|---|---|
| 3,166,624 | 1/1965 | Vargady | 356/395 |
| 3,427,463 | 2/1969 | Weyrauch | 250/237 G |
| 3,796,498 | 3/1974 | Post | 356/374 |
| 3,812,352 | 5/1974 | MacGovern | 250/237 G |
| 3,842,261 | 10/1974 | MacGovern et al. | 250/237 G |

FOREIGN PATENT DOCUMENTS

| | | |
|---|---|---|
| 1014748 | 2/1958 | Fed. Rep. of Germany. |
| 1026087 | 11/1960 | Fed. Rep. of Germany. |
| 1448504 | 12/1968 | Fed. Rep. of Germany. |
| 1156244 | 6/1970 | Fed. Rep. of Germany. |
| 127552 | of 1960 | U.S.S.R. ............ 250/237 G |

OTHER PUBLICATIONS

Machine Shop Magazine, 4-62, pp. 208-209.
Zverev, A. E., Translation of USSR Inventors Certificate #127552.

Primary Examiner—William H. Punter
Attorney, Agent, or Firm—Hume, Clement, Brinks, Willian & Olds, Ltd.

[57] ABSTRACT

An incremental photoelectric measuring device is described including a measuring scale having a line grid and a scanning plate having a line grid, wherein the grid spacings of the two line grids are unequal such that one is an integral multiple of the other. Preferably the scale is provided with the coarser, less expensive to manufacture, line grid and the scanning plate is provided with the finer line grid. In this case the resolution of the measuring device is governed by the fine line grid of the scanning plate which can readily be changed to alter the resolution of the device. Two preferred separations between the scale and the scanning plate are described, which separations provide refraction doubling of the coarser line grid and enhanced spatial precision, respectively.

2 Claims, 3 Drawing Figures

INCREMENTAL PHOTOELECTRIC MEASURING DEVICE

BACKGROUND OF THE INVENTION

The present invention relates to a photoelectric incremental measuring system utilizing a collimated light beam for measuring the relative position of two objects by means of a scale and a scanning plate, both of which comprise a line grid having a predetermined grid spacing, wherein the scale and the scanning plate are mounted to move with respect to one another while maintaining a substantially constant relative spacing.

In one type of incremental length and angle measuring device of the prior art, position dependent electrical signals are generated by means of a scale mounted to move with respect to a scanning plate at a certain spacing. Typically, both the scale and the scanning plate are provided with a line grid having a predetermined grid spacing. Suitable illumination is provided such that movement of the scanning unit with respect to the scale produces fluctuations in the intensity of light directed at the scale, which fluctuations are detected by means of photoelectric transducers such as phototransistors. Electrical signals generated by the photoelectric transducers provide a measure of the relative displacement between the scale and the scanning plate.

In incremental measuring systems of the prior art the scale and the scanning plate are generally provided with grid spacings which are virtually identical. Optimal optical signals are generated only at a certain predetermined distance from the scanning plate, which distance is a function of refraction or reproduction between the scale and the scanning plate. For optimal functioning of the apparatus this distance must be maintained constant within a certain tolerance. When a scale and a scanning plate with the grid spacing $P_M$ are illuminated with collimated light of the wavelength $\lambda$ the optimum spacing is $nP_M^2/\lambda$ ($n=0, 1, 2 \ldots$) and for the tolerance $\pm(0.1 \ldots 0.2) P_M^2/\lambda$ (Machine Shop Magazine, April 1962, page 208).

In West German unexamined patent specification OS No. 1,448,504 there is described a photoelectric length measuring device in which the distance between the grid scale and the grid scanning plate amounts to $Ka^2/\lambda$, K being a positive whole number, preferably one, a being the grid spacing, and $\lambda$ the spectral sensitivity center of gravity of the entire photoelectric arrangement. To achieve a sine or a $\sin^2$ curve for the light distribution behind the grid scanning plate the ratio of the width of an absorbing line to the width of a transparent line of the grid scale is chosen to be appreciably smaller than 1:1, for example 3:7, the grid spacing of the scale being equal to the grid spacing of the scanning plate.

Scales and scanning plates with large grid spacings can be made more easily and more cheaply than those with small grid spacings. In order to achieve higher resolution in the measurement of relative movement between the scale and the scanning plate the electric signals of the photoelectric transducers are often subdivided electronically by a suitable circuit, which circuit is in many cases relatively expensive to manufacture.

SUMMARY OF THE INVENTION

The present invention is directed to an improved photoelectric measuring device which is less subject to the afore-mentioned disadvantages associated with small grid spacings and electronic subdivision circuits. This improved measuring device can be simply constructed, and for a given grid spacing provides a high resolution measurement without requiring electronic subdivision. According to this invention the grid spacing of the scale and the grid spacing of the scanning plate differ such that one is an integral multiple of the other.

One important advantage of this invention is that an optical subdivision of the larger grid spacing by an integer factor is achieved. In the preferred embodiment only the scanning plate is provided with a line grid with a narrow grid spacing, and it is this narrow grid spacing which determines the resolution of the measuring system. By simply changing the grid spacing of the scanning plate without altering the grid spacing of the scale the resolution of the measuring system can be varied. Expensive electronic subdivision circuits can, therfore, be dispensed with. Further, many embodiments of this invention allow the use of a greater distance between scale and scanning plate with a larger tolerance, which is generally easier to maintain.

The invention, together with further objects and attendant advantages, will be best understood by reference to the following description taken in conjunction with the accompanying drawings.

DETAILED DESCRIPTION OF A PREFERRED EMBODIMENT

Figure 1:
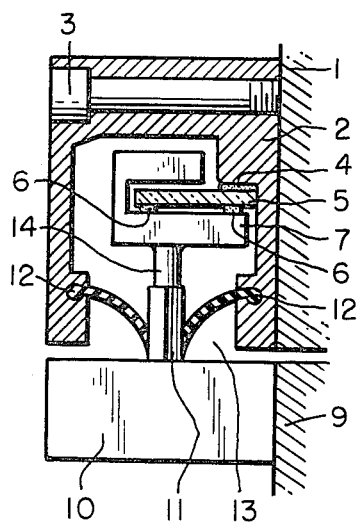
FIG. 1 is a cross sectional view of a preferred embodiment of a length measuring device embodying the invention.

Referring now to the drawings, FIG. 1 shows a bed 1 of a processing or measuring machine to which is secured a preferred embodiment of an encapsulated length measuring apparatus embodying the invention. This measuring apparatus includes a housing 2 in the form of a hollow profile which is mounted to the bed 1 by a screw 3. A scale 5 with a line grid is mounted on the housing 2 by means of an elastic adhesive layer 4. A scanning unit 7 including a scanning plate 8 (FIG. 2) with a line grid for the scanning of the line grid of the scale 5 is supported on the scale 5 by rollers 6. A mounting base 10 is mounted to a slide piece 9 movable relatively to the bed 1 of the processing or measuring machine. This mounting base 10 is connected to a blade-like member 11 which passes through a slit 13 formed in the otherwise completely enclosed housing 2. Sealing lips 12 act to close the slit 13. The blade-like member 11 is connected to a coupling member 14, which in turn is coupled to the scanning unit 7 and transfers relative movement of the slide piece 9 with respect to the bed 1 to the scanning unit 7.

Figure 2:
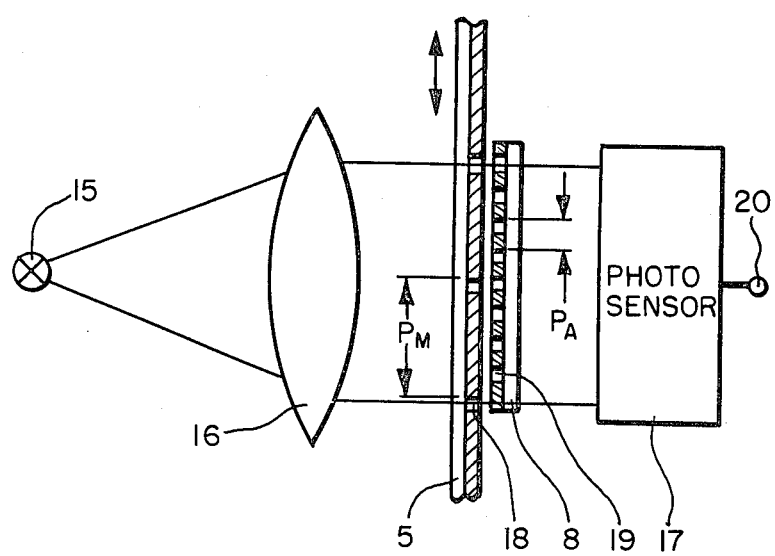
FIG. 2 is a schematic representation of the photoelectric system of the measuring device of FIG. 1.

FIG. 2 shows a schematic representation of the photoelectric arrangement of the scanning unit 7, in which light from a lamp 15 passes through a collimator 16, the scale 5 and the scanning plate 8 onto photosensor elements 17. When the scale 5 moves relative to the scanning plate 8 in the direction of the double arrow, the scanning photosensors 17 generate periodic electrical signals which are conducted by means of a terminal 20 to an electronic evaluating unit (not shown) of a display unit to display the position of the slide piece 9.

In this preferred embodiment of the invention the grid spacing $P_M$ of the scale 5 is equal to four times the value of the grid spacing $P_A$ of the scanning plate 8, and the scale 5 has a corresponding ratio of bright-field width 18 to grid spacing $P_M$ of about 1:8, while the ratio of bright-field width 19 to grid spacing $P_A$ at the scanning plate 8 amounts to about 1:2. The bright field width 18 of the scale 5 is therefore substantially equal to the bright field width 19 of the scanning plate 8. When the scale 5 is mounted with respect to the scanning plate 8 at a small parallel spacing from the plate 8 an optical subdivision of the grid constant $P_M$ by a factor of four is achieved. Here only the scanning plate 8 is provided with a line grid with a small grid spacing $P_A$ that determines the resolution of the measuring system. The scale 5 has a greater grid spacing $P_M$ and, therefore, is easier and cheaper to manufacture. By merely changing the grid spacing $P_A$ of the scanning plate 8 the resolution of the measuring system can be changed; an expensive electronic subdivision circuit can, therefore, be dispensed with. In general, the ratio of the bright field width 18 to the grid spacing $P_M$ should be $1:(2 \times n)$, where n is a postive integer.

Figure 3:
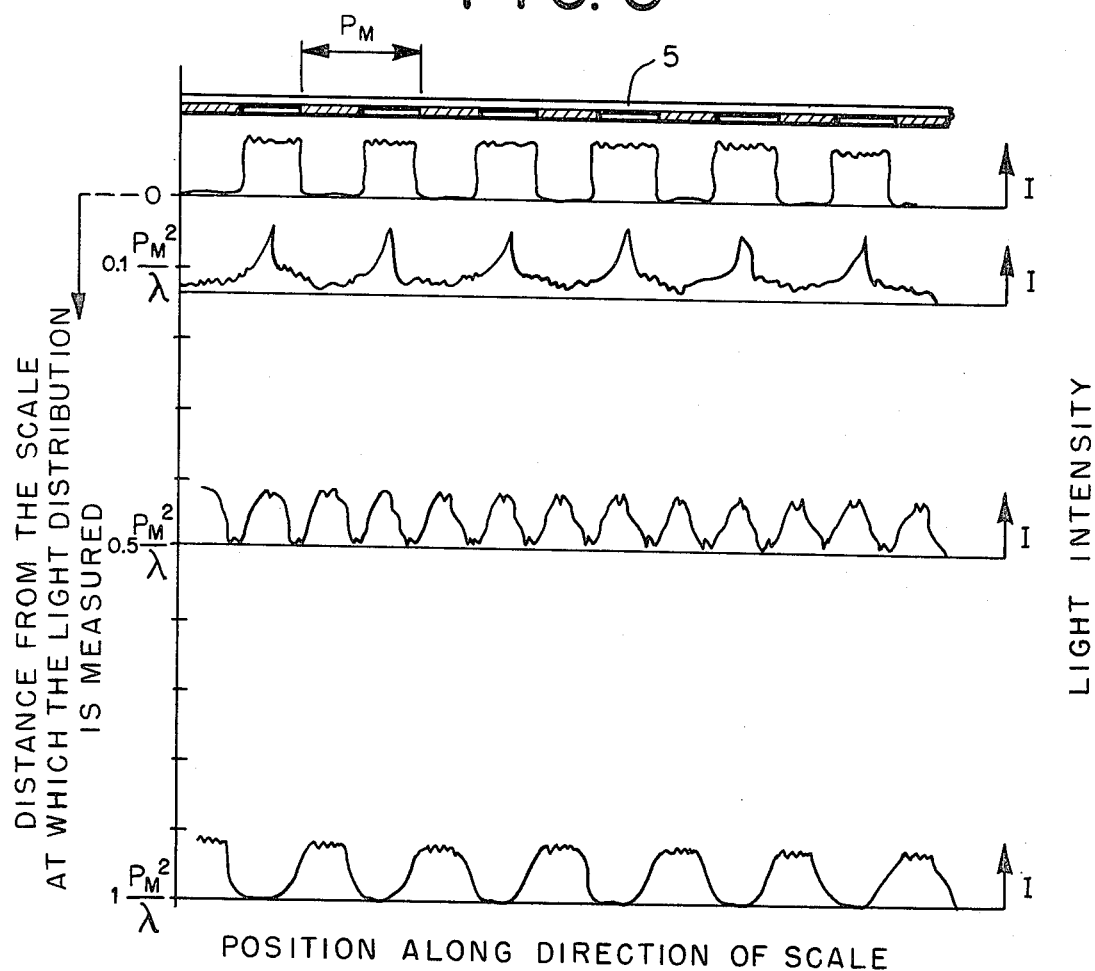
FIG. 3 is a graphic representation of the distribution of the light intensity behind the line grid of the scale of FIG. 2 as a function of the distance from the scale to the measuring plane at which the intensity distribution is measured.

In FIG. 3 there is presented a graphic representation of the intensity distribution I of the light flux behind the line grid of the scale 5 as a function of the distance from the scale 5 of the plane at which the intensity distribution is measured. This intensity distribution corresponds analogously to the distribution of light intensity as a function of the distance between the scale 5 and the scanning plate 8. As is well known, in the illumination of a line grid with monochromatic parallel light the intensity distribution I of the light behind the line grid in consequence of refraction effects is a function of the distance from the grid at which the intensity distribution I is measured. At a certain distance from the line grid there arises an intensity distribution I having a characteristic wavelength equal to half the grid spacing of the line grid.

Another preferred embodiment of the invention (not shown), the scanning plate 8 is guided at a parallel spacing of preferably about 0.5 $P_M^2/\lambda$ from the scale 5, the grid spacing $P_A$ of the plate 8 is half the value of the grid spacing $P_M$ of the scale 5, and the scale 5 has a ratio of bright-field width 18 to grid spacing $P_M$ of 1:2. Here $\lambda$ is used to signify the spectral sensitivity center of gravity of the photoelectric system. This embodiment provides the dual advantages that in the first place, there is achieved an optical subdivision of the grid spacing $P_M$ of the scale 5 by a factor two and, in the second place, the greater distance between the scanning plate 8 and scale 5 permits a greater tolerance, which is easier to maintain.

In another preferred embodiment of the invention the scanning plate 8 is guided at a parallel distance of preferably about 0.1 $P_M^2/\lambda$ from the scale 5, because there, as can be seen from FIG. 3, the light distribution is characterized by very narrow intensity maxima, so that a scale 5 with a ratio of bright-field width 18 to grid spacing $P_M$ of 1:2 can be used, the grid spacing $P_M$ of which presents two to four times the value of the grid spacing $P_A$ of the scanning plate 8. With this measure, therefore, there is achieved an optical subdivision of the grid constant $P_M$ of the scale 5 by the factor two to four.

Of course, it should be understood that various changes and modifications will be apparent to those skilled in the art. Such changes and modifications can be made without departing from the spirit and scope of the invention. It is intended, therefore, that such changes and modifications be covered by the following claims.

I claim:
1. A photoelectric incremental measuring device comprising:
   a measuring scale having a first line grid with a first grid spacing wherein the ratio of the bright-field width of the scale to the first grid spacing is about $1:(2 \times n)$, where n is a positive integer greater than one;
   a scanning plate having a second line grid with a second grid spacing, wherein the ratio of the bright-field width of the scanning plate to the second grid spacing is about 1:2 and the first grid spacing is substantially an integral multiple of the second grid spacing;
   means for generating a collimated beam of light;
   means for measuring light intensity; and
   means for mounting the scanning plate adjacent the scale to modulate the intensity of the collimated beam of light generated by the generating means which reaches the measuring means such that the scanning plate is movable substantially parallel to the scale and no focusing elements are mounted between the scale and the scanning plate.
2. The invention of claim 1 wherein the bright-field width of the scale is substantially equal to the bright-field width of the scanning plate and the the intergral multiple is equal to n such that the grid spacing of the scale is substantially equal to n times the grid spacing of the scanning plate.

* * * * *